United States Patent [19]

Derringer

[11] Patent Number: 4,595,169
[45] Date of Patent: Jun. 17, 1986

[54] MOLD FOR MAKING A FASTENER ASSEMBLY

[75] Inventor: Gene R. Derringer, Centerville, Ohio

[73] Assignee: Monarch Marking Systems, Inc., Dayton, Ohio

[21] Appl. No.: 761,443

[22] Filed: Aug. 1, 1985

Related U.S. Application Data

[62] Division of Ser. No. 654,345, Sep. 25, 1984, Pat. No. 4,554,711.

[51] Int. Cl.[4] .......................... B29F 1/14; B29C 1/00
[52] U.S. Cl. .................................... 249/67; 264/291; 425/444
[58] Field of Search ................ 249/67, 68; 264/291; 425/444

[56] References Cited

U.S. PATENT DOCUMENTS

| 3,380,122 | 4/1968 | Kirk | 425/444 X |
| 4,076,483 | 2/1978 | Smirne | 425/444 |
| 4,143,113 | 3/1979 | Susuki | 264/291 |
| 4,255,111 | 3/1981 | Suzuki | 425/444 X |
| 4,429,437 | 2/1984 | Paradis | 264/291 X |

Primary Examiner—J. Howard Flint, Jr
Attorney, Agent, or Firm—Joseph J. Grass

[57] ABSTRACT

There is disclosed a mold for making a fastener assembly which is substantially less expensive to construct and maintain than existing molds. The disclosed mold uses one-half the number of ejector pins ordinarily used in molding fastener assemblies having connected fasteners with bar sections and button sections joined by filament sections. The improved fastener assembly is useable in a hand-held tag attacher of a well-known type, e.g., as disclosed in U.S. Pat. No. 3,650,452.

3 Claims, 5 Drawing Figures

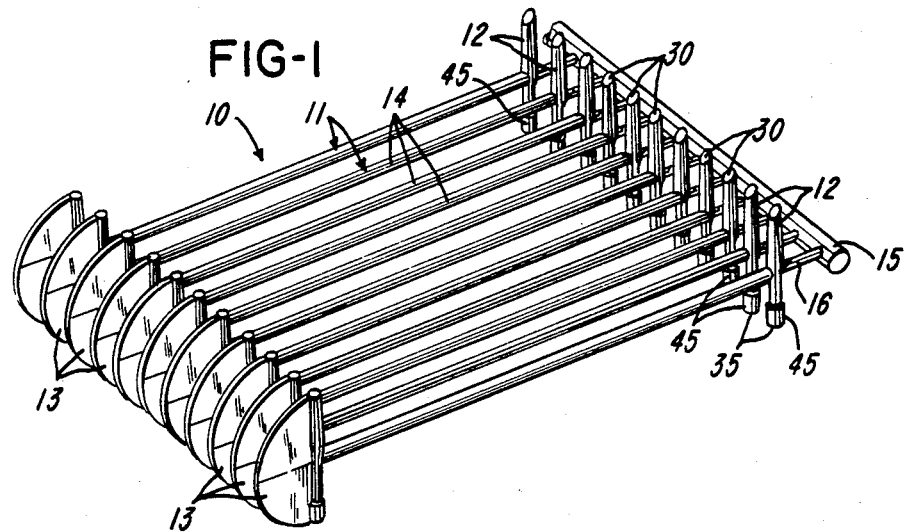
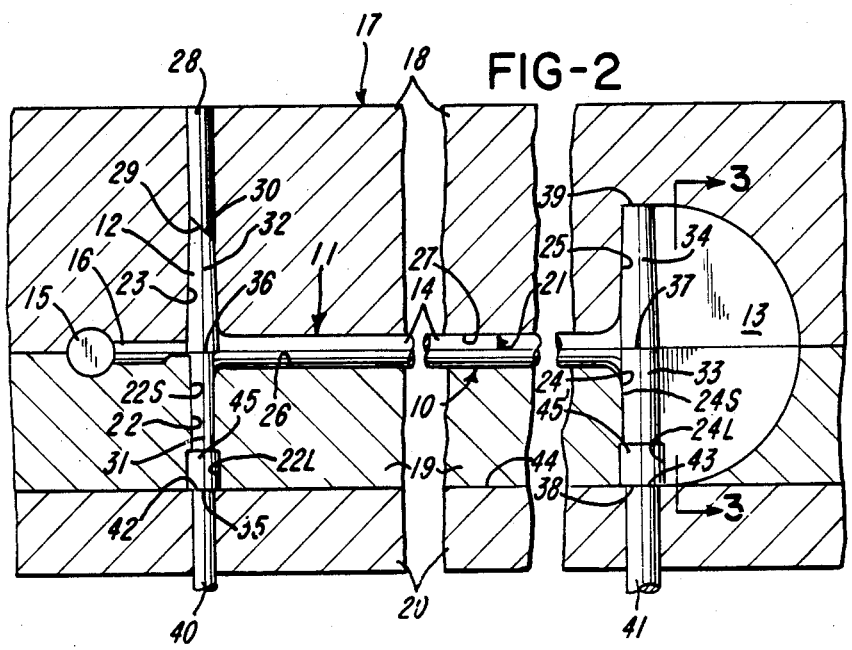

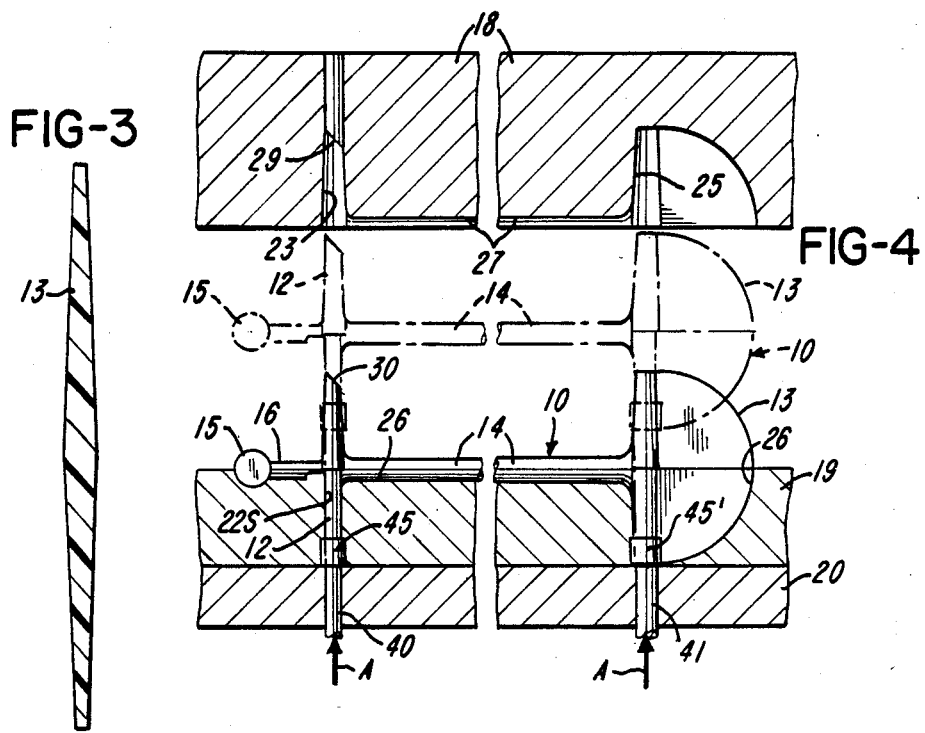
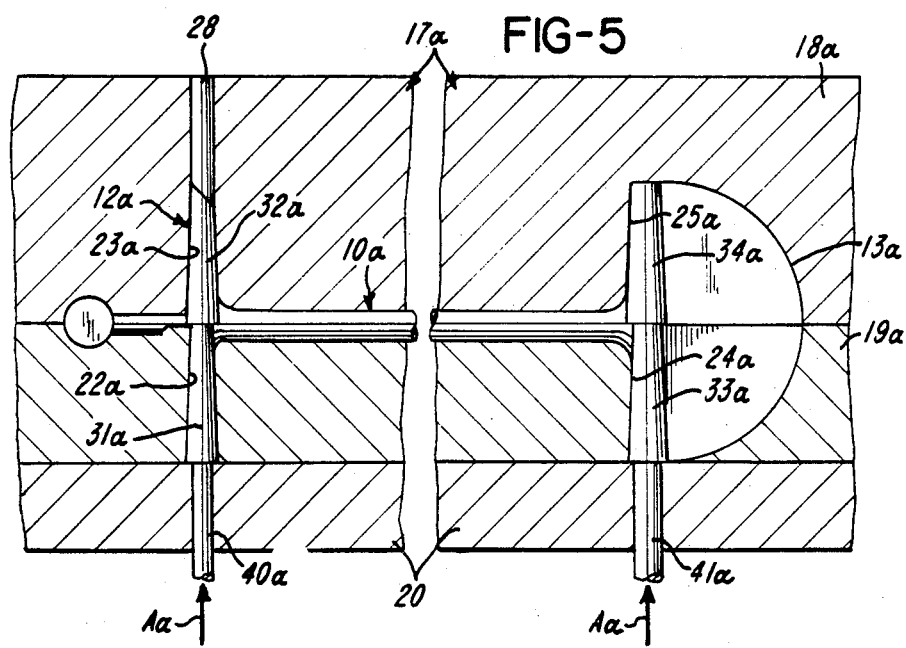

MOLD FOR MAKING A FASTENER ASSEMBLY

CROSS-REFERENCE TO RELATED APPLICATION

This is a division of application Ser. No. 654,345, filed Sept. 25, 1984, now U.S. Pat. No. 4,554,711.

BACKGROUND OF THE INVENTION

1. Field of the Invention

This invention relates to the fastener art and to the art of molding fasteners.

2. Brief Description of the Prior Art

U.S. Pat. Nos. 3,103,666; 3,185,367; 3,380,122; 3,650,452; 3,765,110; 3,924,298 and 4,347,932 are made of record.

SUMMARY OF THE INVENTION

This invention relates to an improved mold. The mold is simple and is of low-cost construction because it requires a significantly lower number of ejector pins than molds for fastener assemblies used heretofore. This is accomplished by constructing the mold so as to readily release one portion of the fastener assembly from one portion or part of the mold while releasably holding the other portion of the fastener assembly in another portion of the mold. More specifically, in that the fasteners are elongate, it is desired that its bar section, its filament section and its button section release readily from one part of the mold but are releasably held by the other part of the mold. No ejector pins are required in the one part of the mold, and ejector pins are only used on the other part of the mold. The bar section and the button section of each fastener are releasably held in the other part of the mold by a variation in their side configurations. The variations can take a variety of forms, for example, one portion of the bar section and of the button section can be molded with a localized enlargement, or a reduction in diameter, or it can be molded with negative draft or taper. The side variation holds the one portion of the fastener assembly in the other mold part while the one mold part is moved relatively away. The disclosed fastener assembly can be used in a hand-held tag attacher of the type shown in U.S. Pat. No. 3,650,452.

DESCRIPTION OF THE DRAWINGS

FIG. 1 is a fragmentary perspective view of a fastener assembly in accordance with one embodiment of the invention;

FIG. 2 is a fragmentary sectional view through a mold of the invention with the fastener assembly therein;

FIG. 3 is a sectional view of a button section taken generally along line 3—3 of FIG. 2;

FIG. 4 is a sectional view of the fastener assembly, with the mold in the open position; and FIG. 5 is a fragmentary sectional view through a mold and a fastener assembly in accordance with another embodiment of the invention.

DESCRIPTION OF THE PREFERRED EMBODIMENTS

With reference to FIG. 1, there is shown a fastener assembly generally indicated at 10 in accordance with one embodiment of the invention. The fastener assembly 10 includes a plurality of fasteners 11 including bar sections 12 and button or head sections 13 joined by filament sections 14. A rod or runner 15 is connected to the bar sections 12 by connectors 16.

With reference to FIG. 2, the assembly 10 is made in a mold 17 using moldable plastics material. The mold 17 is shown to include mold portions 18, 19 and 20. The mold portions 18 and 19 include a mold cavity generally indicated at 21. The mold cavity 21 includes bar section cavity portions 22 and 23, button section cavity portions 24 and 25, and filament section cavity portions 26 and 27. The mold 17 contains a circular cylindrical pin 28 having a truncated end 29 which forms a truncated end 30 on the bar section 12. The bar section 12 has first bar portion 31 and a second bar portion 32, and the button section 13 has a first button portion 33 and a second button portion 34. The bar portions 31 and the button portions 33 are molded in the mold portion 19 and the bar portions 32 and the button portions 34 are molded in the cavity portion 18. Each filament section 14 is joined to its bar section 12 between the truncated terminal end 30 and a terminal end 35. The bar portion 31 extends from the location or place of joinder 36 of the filament section 14 and the end 35, and the bar portion 32 extends from the location or place of joinder 36 of the filament section 14 and the end 30. The button portion 33 extends from the location or place of joinder 37 of the filament section 14 and an end 38, and the button portion 34 extends from the location or place of joinder 37 of the filament section and an end 39. The mold portion 20 slidably mounts ejector pins 40 and 41 having respective flat ends 42 and 43 generally aligned with flat surface 44 of the mold portion 20.

In accordance with the invention, the bar portion 31, which is generally circular cylindrical, has a variation in its outer surface illustrated to be an enlargement or flanged portion 45. The bar portion 32, which is generally circular cylindrical, is free of any such variation in its outer surface. Following molding, the mold portion 18 is moved relatively away from the mold portion 19, as best shown in FIG. 4. The fastener assembly 10 remains on the mold portion 19 because of the enlargement 45 and 45' but the fastener assembly 10 separates or releases readily from the mold part 18. In the open position of the mold 17, the ejector pins 40 and 41 are moved in the direction of arrows A, and the fastener assembly 10 is moved to the position shown by phantom lines in FIG. 4. The enlargements 45 and 45' deform resiliently as they are forced through the slightly smaller sections 22S and 24S of the cavity portions 22 and 24. The larger sections 22L and 24L of the respective cavity portions 22 and 24 are only very slightly larger than the smaller sections 22S and 24S. For example, by way of example not limitation, the smaller sections 22S and 24S have a diameter of about 0.97 millimeter and the larger sections 22L and 24L have a diameter of about 1.06 millimeters. The variation of dimensions need only be sufficient to hold the fastener assembly 10 in the solid line position shown in FIG. 4 while the mold portions 18 and 19 separate. But for the invention, it would be necessary to have ejector pins in the mold portion 18 as well, It is, thus, apparent that the number of ejector pins is reduced by fifty percent over a conventional mold shown for example in U.S. Pat. No. 3,380,122. This substantially reduces the cost of the mold both initially and when the mold becomes worn and needs repair.

The bar and button portions 32 and 34 are shown exaggeratedly to be tapered (especially FIGS. 2 and 3)

to aid in release from the mold portion 18, however the draft angle is slight, for example, is about one degree per side.

With reference to the embodiment of FIG. 5, the fastener assembly 10a is shown to have fasteners 11a, each having a bar section 12a and a button section 13a joined by a filament section 14a. The fastener assembly 10a and the mold 17a are generally the same as the fastener assembly 10 and the mold assembly 17 except as follows. The cavity portions 22a and 24a are slightly tapered so that when the mold 17 is opened the fastener assembly 10a will release from the mold portion 18a but will not release from the mold portion 19a until the ejector pins 40a and 41a, slidably mounted by the mold portion 20, move in the direction of arrows Aa and eject the fastener assembly 10a from the mold 10a. The negative draft or taper is slight and constitutes an alternative functional variation in the side of the bar portion 31a and the side of the button portion 33a which hold the fastener assembly 10a in the mold 17a until the bar portions 32a and the button portions 34a are released and until the ejector pins 40a and 41a move in the direction of arrows Aa to eject the fastener assembly 10a. The negative draft or taper of the cavity portions 22a and 24a is slight, by way of example not limitation, about one degree per side. Thus, also with the embodiment of FIG. 5, no ejector pin is needed for the cavity portions 23a and 25a.

Although each bar section 32 and 32a is shown to have a truncated terminal end 30 so as to work well in a hand-held tag attacher disclosed in U.S. patent application of Larry Dean Strausburg filed on even date herewith, Ser. No. 654,333, the invention is also applicable to fasteners with bar sections having terminal ends perpendicular to the axis of the bar section as in U.S. Pat. No. 3,650,452, in which event the pin 28 would have a terminal end perpendicular to its axis.

Other embodiments and modifications of the invention will suggest themselves to those skilled in the art, and all such of these as come within the spirit of this invention are included within its scope as best defined by the appended claims.

I claim:

1. A mold for making a one-piece fastener assembly, comprising: a mold having at least two mold portions defining a mold cavity for molding connected fasteners, with each fastener having a bar section and a button section joined by a filament section, wherein the bar sections having first and second bar portions, one mold portion having a plurality of first cavity portions for molding first bar portions of the bar sections and another mold portion having a corresponding plurality of second cavity portions for molding second bar portions of the bar sections, the first cavity portions and the second cavity portions being generally aligned, wherein each first cavity portion has means for molding a first bar portion with a greater resistance to release than the resistance to release of the respective second bar portion from the second cavity portion, and ejector pins in the mold for the first bar portions but not for the second bar portions.

2. A mold for making a one-piece fastener assembly, comprising: a mold having at least two mold portions defining a mold cavity for molding connected fasteners, with each fastener having a bar section and a button section joined by a filament section, wherein the button sections have first and second button portions and the bar sections have first and second bar portions, one mold portion having a plurality of first bar cavity portions for molding first bar portions of the bar sections and a plurality of first button cavity portions for molding first button portions of the button sections, and another mold portion having a plurality of second bar cavity portions for molding second bar portions of the bar section and a plurality of second button cavity portions for molding second button portions, the first bar cavity portions and the second bar cavity portions being generally aligned, the first button cavity portions and the second button cavity portions being generally aligned, wherein each first bar cavity portion has means for molding a first bar portion with a greater resistance to release than the resistance to release of the respective second bar portion from the second bar cavity portion, wherein each first button cavity portion has means for molding a first button portion with a greater resistance to release than the resistance to release of the respective second button portions from the second button cavity portion, and ejector pins in the mold for the first bar portions and the first button portions but not for the second bar portions and not for the second button portions.

3. A mold for making a one-piece fastener assembly, comprising: a mold having at least two mold portions defining a mold cavity for molding connected fasteners, with each fastener having a bar section and a button section joined by a filament section, wherein the button sections have first and second button portions, one mold portion having a pluraltiy of first cavity portions for molding first button portions of the button sections and another mold portion having a corresponding plurality of second cavity portions for molding second button portions of the button sections, the first cavity portions and the second cavity portions being generally aligned, wherein each first cavity portion has means for molding a first button portion with a greater resistance to release than the resistance to release of the respective second button portion from the second cavity portion, and ejector pins in the mold for the first button portions but not for the second button portions.

* * * * *